(12) United States Patent  
Hanser et al.

(10) Patent No.: US 8,186,744 B1  
(45) Date of Patent: May 29, 2012

(54) RECREATIONAL VEHICLE WITH A CONVERTIBLE BED

(75) Inventors: Paul Edmund Hanser, Tipton, IA (US); Vincent D. Buls, Tipton, IA (US)

(73) Assignee: HWH Corporation, Moscow, IA (US)

( * ) Notice: Subject to any disclaimer, the term of this patent is extended or adjusted under 35 U.S.C. 154(b) by 241 days.

(21) Appl. No.: 12/582,818

(22) Filed: Oct. 21, 2009

(51) Int. Cl.
*B60P 3/39* (2006.01)
*B60P 3/34* (2006.01)

(52) U.S. Cl. .............. 296/170; 296/173; 296/176; 5/47; 5/18.1; 5/53.1

(58) Field of Classification Search .... 296/26.01–26.03, 296/26.08–26.15, 156–176; 5/18.1, 20, 47, 5/53.1, 118; *B60P 3/34*
See application file for complete search history.

(56) References Cited

U.S. PATENT DOCUMENTS

| | | | | |
|---|---|---|---|---|
| 3,900,905 A * | 8/1975 | Johnson et al. | ..................... | 5/2.1 |
| 4,620,335 A * | 11/1986 | Dodgen | ............................. | 5/118 |
| 6,857,689 B2 * | 2/2005 | Dodgen | ......................... | 296/156 |
| 2002/0178502 A1 * | 12/2002 | Beasley et al. | .................... | 5/618 |
| 2004/0017096 A1 * | 1/2004 | Crean | ............................ | 296/175 |
| 2005/0204469 A1 * | 9/2005 | Piretti | ............................... | 5/18.1 |
| 2009/0320210 A1 * | 12/2009 | McArthur | ......................... | 5/658 |

* cited by examiner

*Primary Examiner* — Dennis Pedder
*Assistant Examiner* — Jason S Daniels
(74) *Attorney, Agent, or Firm* — Jason R. Sytsma; Shuttleworth & Ingersoll, PLC

(57) ABSTRACT

A convertible bed for a recreational vehicle has a sliding section and an inclining section. The sliding section is engageable with a frame for sliding movement relative to the frame between an extended position and a retracted position. The inclining section is pivotally combined and slidable with the sliding section. The inclining section is positioned for movement relative to the frame between a substantially flat position when the sliding section is in the extended position and an inclined position when the sliding section is in the retracted position.

18 Claims, 8 Drawing Sheets

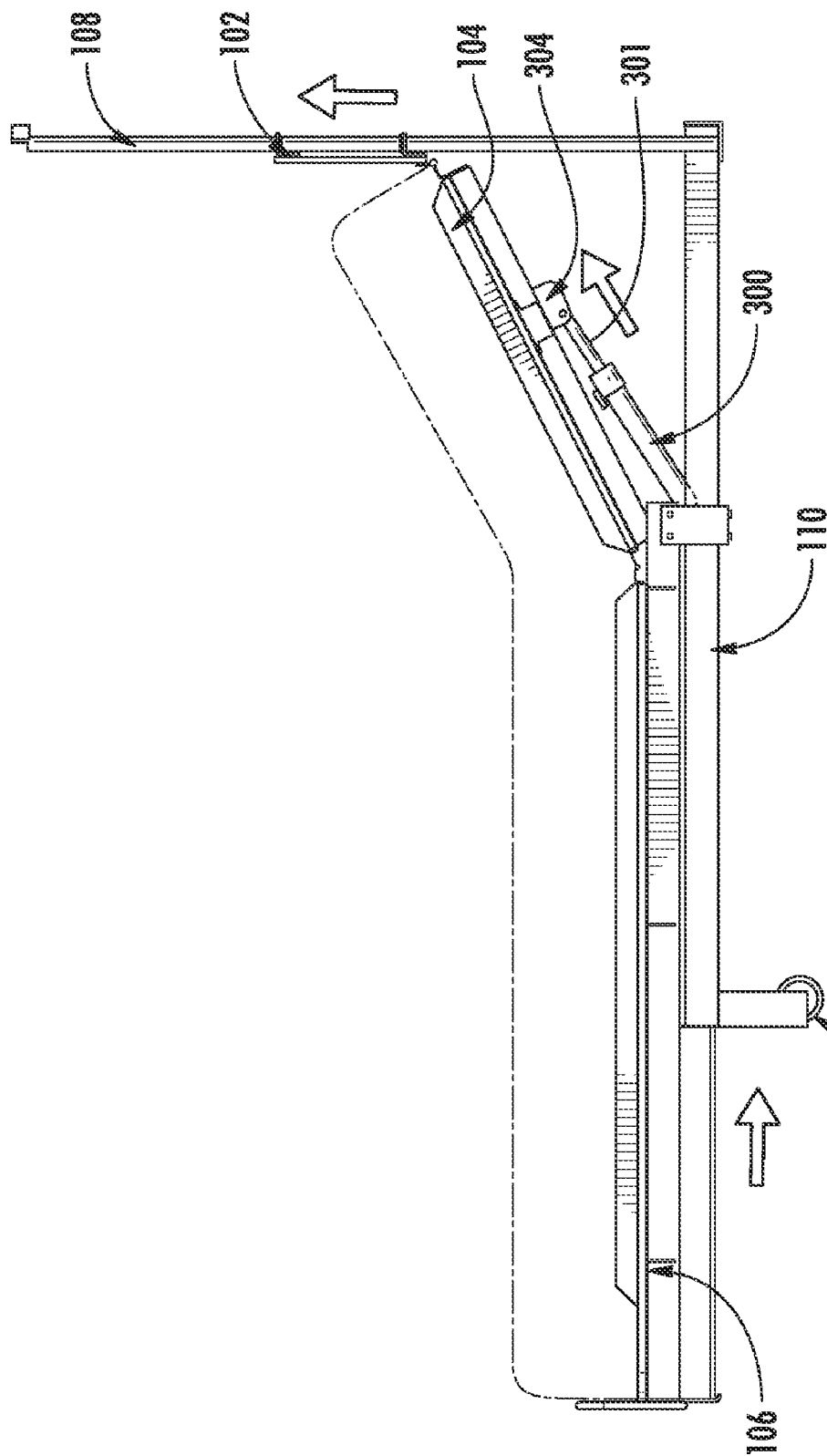

RECREATIONAL VEHICLE WITH A CONVERTIBLE BED

BACKGROUND

The present invention relates to recreational vehicles and, in particular, relates to a movable bed inside the recreational vehicle.

Recreational vehicles (RVs) provide users with comforts and amenities of a home while travelling. While the sizes and levels of amenities vary, RVs have limitations on overall dimensions dictated by vehicle codes. As a result, living quarter space is at a premium and floor plans of RVs need to be carefully designed to optimize the use of the available space.

One popular method of increasing the living quarter space in the RV is to use one or more expandable rooms. Once the RV is stationary and secured, the expandable room expands out to increase the size of the volume of the living quarter space. The expandable room can be actuated in a variety of manners, and can substantially increase the usable space inside the RV.

The space the bed occupies has been another major target for saving space. When the users are sleeping, many other features are not in use and vice versa. Thus, to the extent feasible, the bed space can be convertible for one use during the day and for bed space at night. Beds have previously been hidden in couches to convert the sitting room space and they have been designed into dining booths to convert the eating area.

From the foregoing, there is a need for an improved convertible bed for one use during the day and for bed space at night. Further, there is an improved system that couples a convertible bed in an RV to an expandable room.

SUMMARY

A convertible bed for a recreational vehicle is disclosed. The convertible bed has a sliding section and an inclining section. The sliding section is engageable with a frame for sliding movement relative to the frame between an extended position and a retracted position. The inclining section is pivotally combined and slidable with the sliding section, wherein the inclining section is positioned for movement relative to the frame between a substantially flat position when the sliding section is in the extended position and an inclined position when the sliding section is in the retracted position.

Further disclosed is an expandable room of a recreational vehicle. The expandable room includes a structure moveable between an extended position and a retracted position, and a convertible bed combined with the expandable room.

In one embodiment, the convertible bed comprises a frame and a guide rail combined with and normal to the frame and attachable to a wall of the structure to provide a path of vertical travel for the inclining section. A headboard section may be pivotally combined with the inclining section and engaged with the guide rail for vertical travel thereon. One or more rollers may be combined with the frame and engaging a floor of the structure, wherein movement of the structure causes the frame to roll across the floor.

An actuator moves the inclining section between the substantially flat position and the inclined position. The actuator may be combined with the sliding section and a piston of the actuator is combined with the pivoting section, such that movement of the piston moves the inclining section between the substantially flat position and the inclined position and moves the sliding section relative to the frame. In an alternative embodiment, the actuator is combined with the guide rail and a piston of the actuator is combined with the headboard section to move the headboard section about the guide rail, which moves the inclining section between the parallel position and the angular position relative to the floor of the room.

FIGURES

For a more complete understanding of particular embodiments and their features and advantages, reference is now made to the following description, taken in conjunction with the accompanying drawings, in which:

FIG. 3B is a partial side elevational view of the embodiment of FIG. 1 in a partially inclining position;

DESCRIPTION

Reference will now be made to the drawings wherein like numerals refer to like parts throughout. FIGS. 1-5 illustrate a convertible bed 100 in an expandable room 50 of a recreational vehicle 1. The general structure and operation of expandable rooms in recreational vehicles are well known to those skilled in the art and therefore further details of the expandable room will not be described. For example, U.S. Pat. No. 6,067,756 illustrates a basic structure and operation of an expandable room. The invention is described herein as being applicable to an expandable room 50 that extends outwardly from a side wall of the recreational vehicle 1, but the principles of the invention are not so limited and can be utilized in a typical recreational vehicle not having an expandable room.

Figure 1:
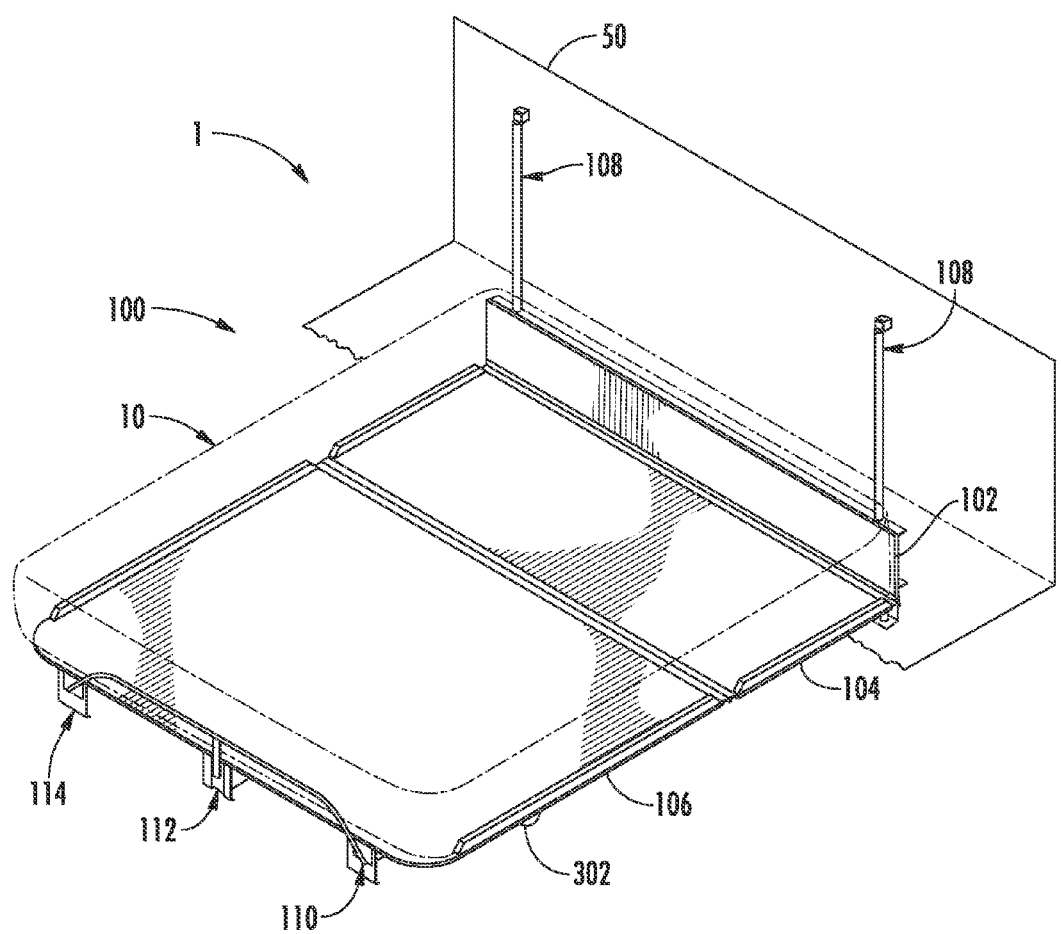
FIG. 1 is a partial perspective view of a recreational vehicle showing an embodiment of the convertible bed of the present invention.
Figure 2:
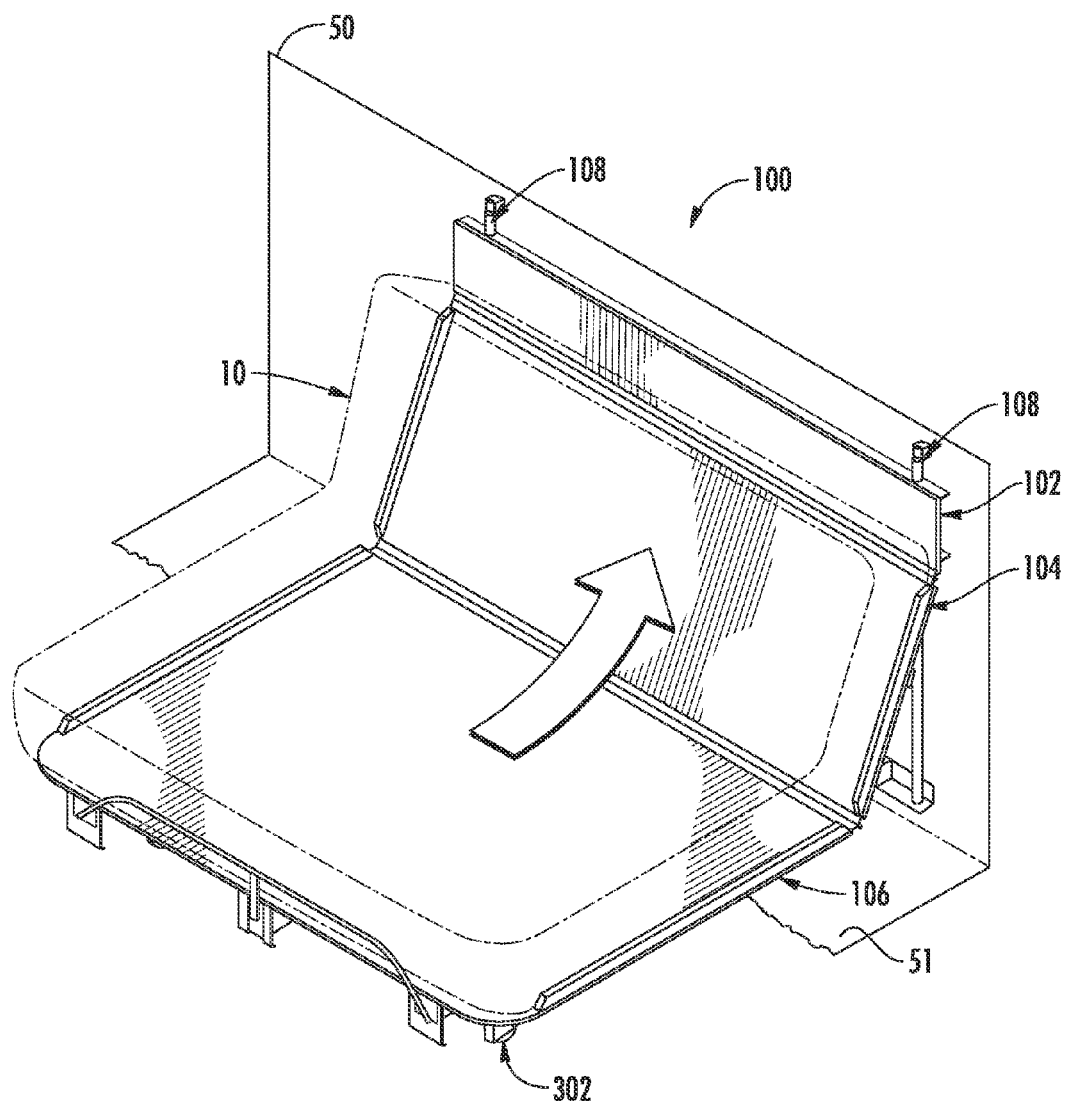
FIG. 2 is a partial perspective view of the embodiment of FIG. 1 in the inclined position.

FIGS. 1 and 2 illustrate two positions of a convertible bed 100 for a recreational vehicle 1. Referring first to FIG. 1, there is illustrated a convertible bed 100 in a substantially flat position useable for occupant sleeping. In FIG. 2 the convertible bed 100 is in an inclined position useable for occupant seating or reducing the space occupied by the convertible bed 100 to create more living space.

The convertible bed 100 has a sliding section 106 that is engageable with a frame 112 for sliding movement relative to the frame between an extended and a retracted position. An inclining section 104 is pivotally combined and slidable with the sliding section 106 for movement between a substantially flat and an inclined position.

The frame 112 of the convertible bed 100 (see FIG. 4) engages the sliding section 106 to provide it with a path for travel. Preferably, a reduced friction surface or bearing pads (not shown) are provided on one of the mating section of the frame 112 and the sliding section 106 to provide a smooth engaging surface for the sliding section 106. Also included with the frame 112 are one or more support members 110 to support the weight of the convertible bed 100.

In the preferred embodiment, the convertible bed 100 is combined with and moves outward with the expandable room 50 of the recreational vehicle 1. The frame 112 is attached to a wall of the expandable room 50 and rollers 302 are positioned under the support members 110 and engaged with the floor of the recreational vehicle 1. When the expandable room 50 is moved to the extended position, the convertible bed 100 moves outward with the expandable room 50 assisted by the rollers 302 underneath the frame 112.

In an alternative embodiment, the convertible bed 100 moves between the substantially flat position and the inclined position in response to the expandable room 50 moving between an extended and retracted position, respectively. The convertible bed 100 is combined with the expandable room 50 such that the motion of the room 50 extending causes the convertible bed 100 to move towards the substantially flat position.

In the preferred embodiment, the frame 112 has one or more guide rails 108 combined with and normal to the frame 112. Alternatively, the guide rails 108 can be separate from the frame 112. The guide rails 108 provide a path of vertical travel for the inclining section 104 and can be self supporting or attached to the wall of the expandable room 50, but in either case, rails 108 are attached to the expandable room so as to move with the expandable room 50 as it is extended or retracted. In yet another embodiment, a headboard section 102 is pivotally combined with the inclining section 104 and engageable with the guide rail 108. When the convertible bed 100 moves to the inclined position the headboard section 102 is pushed upward on the guide rail 108 by the inclining section 104.

Figure 3A:
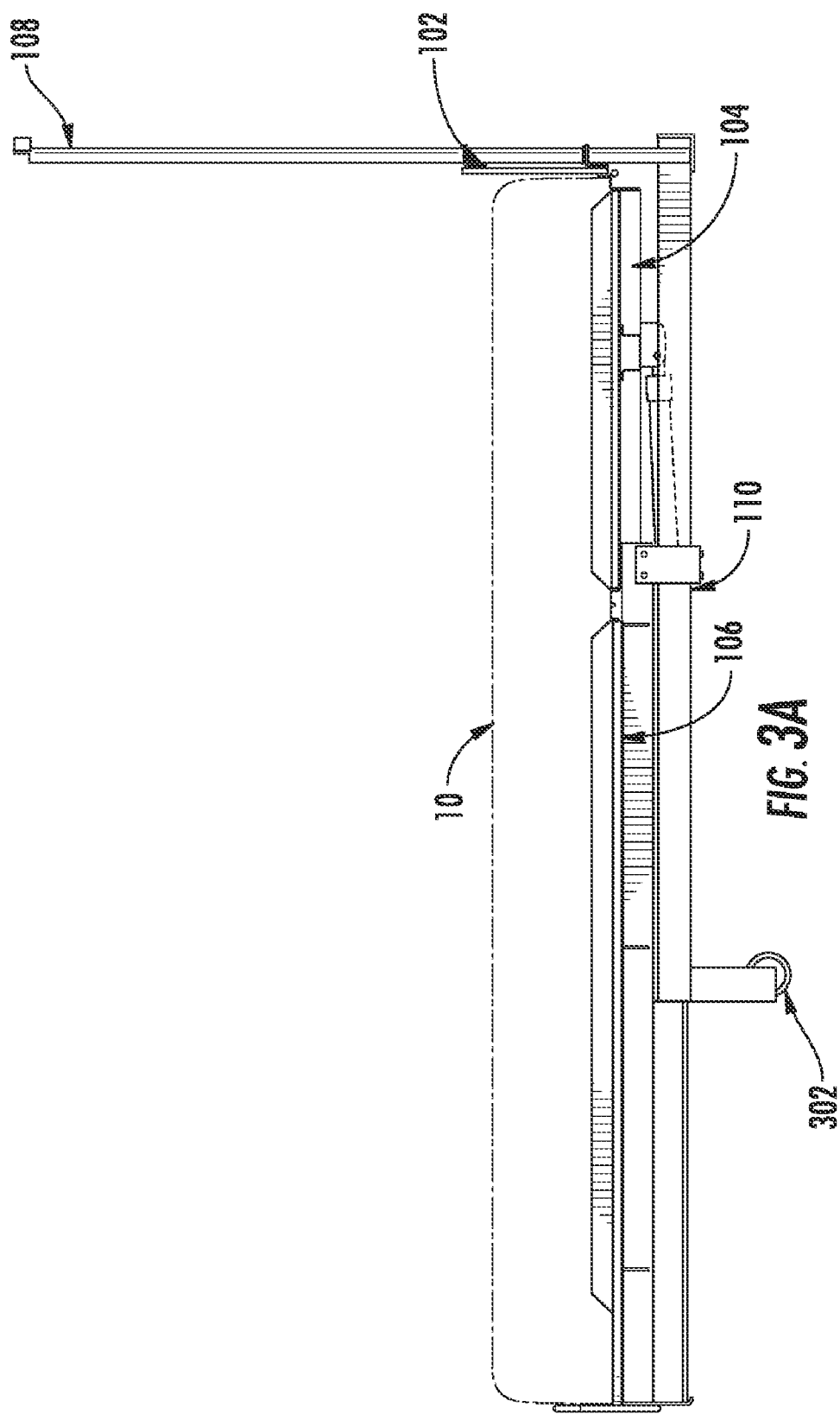
FIG. 3A is a partial side elevational view of the embodiment of FIG. 1 in the substantially flat position.
Figure 3C:
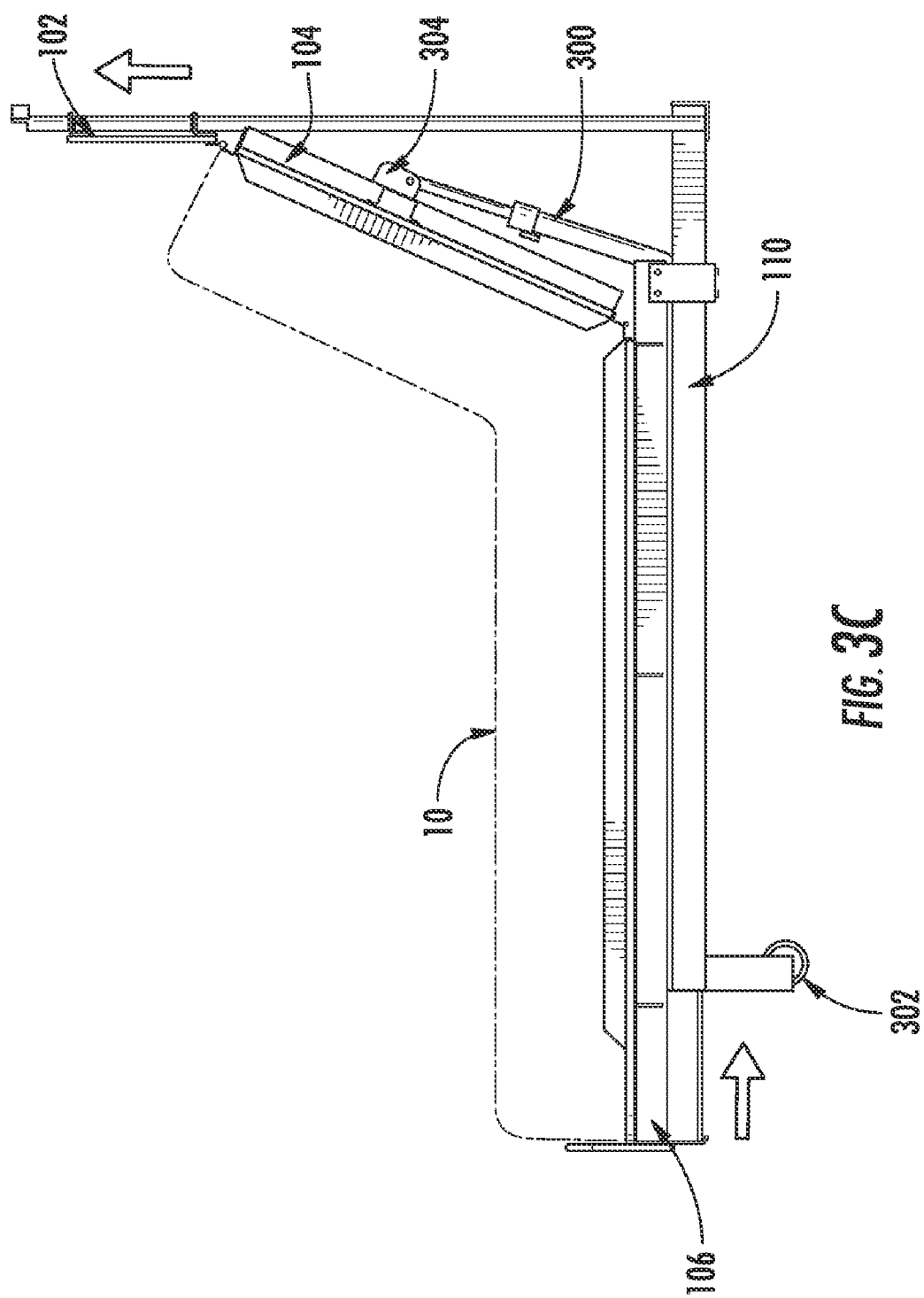
FIG. 3C is a partial side elevational view of the embodiment of FIG. 1 in a further inclined position.
Figure 4:
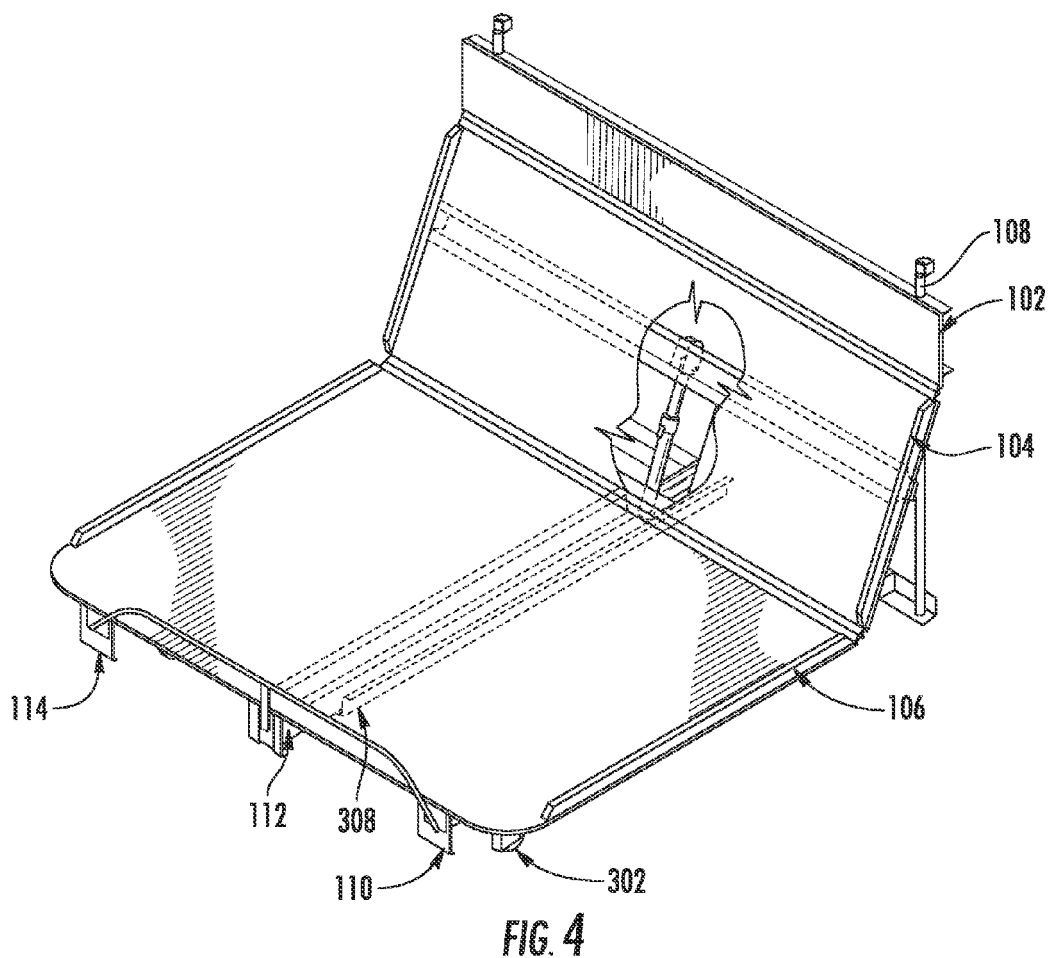
FIG. 4 is a cutaway perspective view of the embodiment of FIG. 1 showing an actuator for automated adjustment of the convertible bed.
Figure 5:
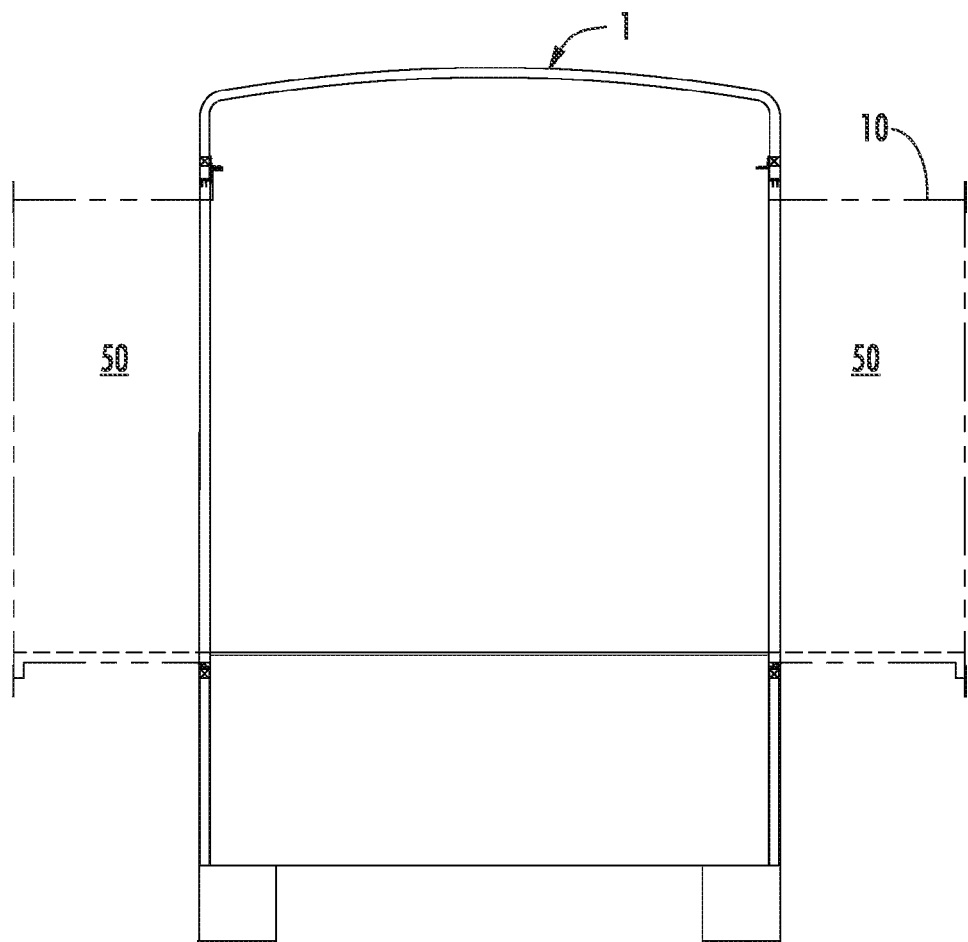
FIG. 5 is a schematic rear elevational view of the recreational vehicle having an expandable room.

The inclining section 104 may be positioned at any angle between the substantially flat and the inclined position by an actuator 300. In the embodiment shown, the actuator 300 is a hydraulic cylinder 300; however, any suitable actuators may be used, such as electric or pneumatic actuators. Referring to FIGS. 3A through 3C, an embodiment of the convertible bed 100 is illustrated from a side elevational view. In FIG. 3A the convertible bed 100 is in the substantially flat position, in FIG. 3C the convertible bed 100 is in the inclined position, and in FIG. 3B the convertible bed 100 is positioned part-way between the substantially flat and the fully inclined position.

The actuator 300 is pivotally combined at its cylinder end to the sliding section 106 and its piston 301 is pivotally combined to the inclining section 104 at a bracket 304. The attachment of the actuator 300 can also be reversed. The extension of the piston 301 causes the inclining section 104 to rotate upward about an axis formed by the pivotal connection between the sliding section 106 and inclining section 104. As the sliding section 106 rotates upward, its other end, the inclining section 104, travels vertically up the guide rail 108. In the embodiment with the headboard section 102, the headboard section 102 is pushed vertically up the guide rail by the inclining section 104. Also, as the inclining section 104 is rotating upward the sliding section 106 is being pulled toward the headboard section 102.

Figure 6:
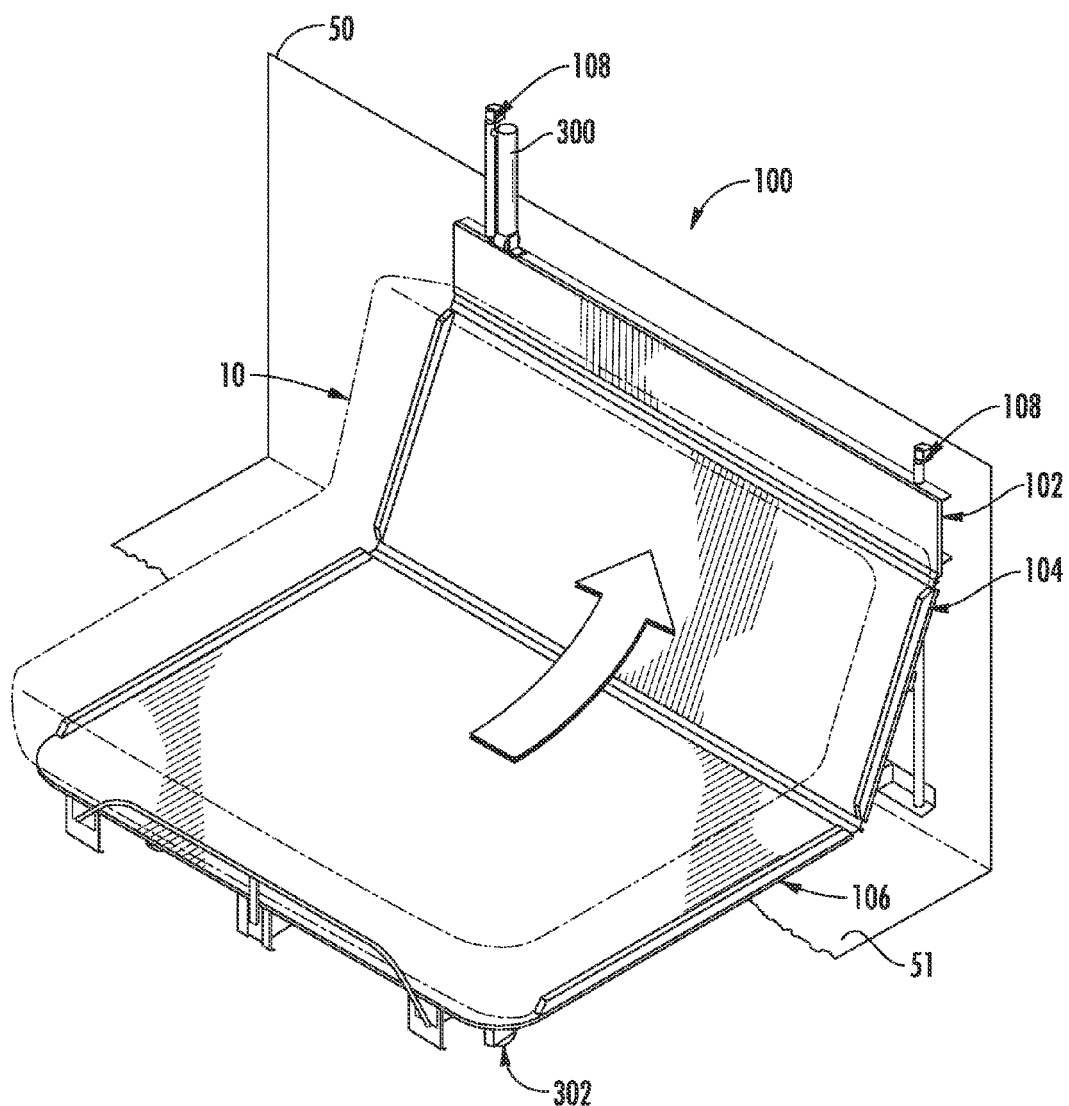
FIG. 6 is a partial perspective view of a recreational vehicle showing an alternative embodiment of the convertible bed of the present invention.

In an alternative embodiment, illustrated in FIG. 6, the actuator 300 is attached at or near the guide rail 108 and the piston 301 is combined with the headboard section 102. The extension and retraction of the actuator 300 pushes and pulls the headboard section 102 along the guide rail 108, which in turn moves the convertible bed 100 between the substantially flat and retracted position.

The convertible bed 100 having the combined sliding section 106 and the inclining section 104 is adapted to receive a mattress (shown in phantom). The two respective sections 104 and 106 can be constructed in any manner suitable for engaging and retaining the mattress. Further, pinch point free connections at the pivoting connection between the respective sections 104 and 104 reduce the risk that the occupant may get his fingers pinched when the convertible bed 100 is moving between positions.

In yet another embodiment, a method for moving a bed 100 in a recreational vehicle 1 is disclosed. The bed 100 has an inclining section positioned for movement between the substantially flat and the inclined positions. The method begins by providing substantially axial motion from an actuator 300 connected between an inclining section 104 and a fixed member. Substantially axial motion from the actuator 300 is converted to a pivoting motion of the inclining section 104. Pivoting motion of the inclining section 104 is converted to linear motion of the sliding section 106. In another embodiment, substantially axial motion from the actuator 300 is converted to vertical motion of a headboard section 102.

Another embodiment discloses moving the bed 100 across a floor 51 of an expandable room 50 of the recreational vehicle 1 in response to the expandable room 50 moving between a retracted position and an extended position. In this embodiment, the method proceeds to move the inclining section 104 to a substantially flat position in response to an expandable room 50 of the recreational vehicle 1 moving to an extended position.

Various aspects of any of the embodiments can be combined in different combinations than the ones shown to create new embodiments that fall within the scope of the appended claims.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents. The invention can be better understood by reference to the following claims. For purpose of claim interpretation, the transitional phrases "including" and "having" are intended to be synonymous with the transitional phrase "comprising."

What is claimed is:
1. A convertible bed for a recreational vehicle, comprising:
 a sliding section for sliding movement between an extended position and a retracted position;
 an inclining section pivotally combined and slidable with the sliding section, wherein the inclining section is moveable between a substantially flat position when the sliding section is in the extended position and an inclined position when the sliding section is in the retracted position;
 a vertical guide rail, wherein the inclining section is attached to the vertical guide rail and moves between the substantially flat position and the inclined position while remaining attached to the vertical guide rail;
 an actuator to move the inclining section between the substantially flat position and the inclined position, wherein the actuator has a cylinder and a piston, the cylinder is combined to the sliding section and the piston of the actuator is combined to the pivoting section, wherein movement of the piston moves the inclining section between the substantially flat position and the inclined position and moves the sliding section relative to the frame.

2. An expandable room of a recreational vehicle, the expandable room comprising:

a structure movable between an extended position and a retracted position;

a convertible bed positioned at least partially in the movable structure, the movable bed including a sliding section for horizontal sliding movement throughout its range of motion between an extended position and a retracted position; and an inclining section pivotally combined and slidable with the sliding section, wherein the inclining section is moveable between a substantially flat position when the sliding section is in the extended position and an inclined position when the sliding section is in the retracted position;

a frame attachable to the structure and combined with the sliding section such that the sliding section is engageable with the frame for sliding movement relative to the frame and the frame is further combined with the inclining section such that the inclining section is moveable relative to the frame between a substantially flat position when the sliding section is in the extended position and an inclined position when the sliding section is in the retracted position; and a vertical guide rail, wherein the inclining section is attached to the vertical guide rail and moves between the substantially flat position and the inclined position while remaining attached to the vertical guide rail, wherein the guide rail is combined with and normal to the frame and attachable to a wall of the structure to provide a path of vertical travel for the inclining section.

3. The expandable room of claim 2, and further comprising a headboard section pivotally combined with the inclining section and engaged with the guide rail for vertical travel thereon.

4. The expandable room of claim 3, and further comprising a roller combined with the frame and engaging a floor of the structure, wherein movement of the structure causes the frame to roll across the floor.

5. The expandable room of claim 4, and further comprising an actuator to move the inclining section between the substantially flat position and the inclined position.

6. The expandable room of claim 5, wherein the actuator is combined to the sliding section and a piston of the actuator is combined to the pivoting section, wherein movement of the piston moves the inclining section between the substantially flat position and the inclined position and moves the sliding section relative to the frame.

7. The expandable room of claim 3, and further comprising an actuator combined with the guide rail and a piston of the actuator combined with the headboard section to move the headboard section about the guide rail which moves the inclining section between the parallel position and the angular position relative to the floor of the expandable room.

8. A method for moving a bed in a recreational vehicle, the bed having an inclining section positioned for movement between a substantially flat position and an inclined position, the method comprising:

providing substantially axial motion from an actuating member connected between the inclining section and a fixed member;

converting the substantially axial motion from the actuating member to a pivoting motion of the inclining section;

and converting pivoting motion of the inclining section to linear and horizontal motion throughout its range of motion of a sliding section;

converting the substantially axial motion from the actuating member to vertical motion of a headboard section.

9. The method of claim 8, and further comprising moving the bed across a floor of an expandable room of the recreational vehicle in response to the expandable room moving between a retracted position and an extended position.

10. The method of claim 9, and further comprising moving the inclining section to a substantially flat position in response to an expandable room of the recreational vehicle moving to an extended position.

11. A convertible bed for a recreational vehicle, comprising:

a sliding section for sliding movement between an extended position and a retracted position;

an inclining section pivotally combined and slidable with the sliding section, wherein the inclining section is moveable between a substantially flat position when the sliding section is in the extended position and an inclined position when the sliding section is in the retracted position;

a headboard section combined with the inclining section for vertical movement with respect to the inclining section.

12. The convertible bed of claim 11, wherein the sliding section moves horizontally between a horizontal extended position and a horizontal retracted position.

13. The convertible bed of claim 12, and further comprising a frame attachable to a floor of the recreational vehicle and combined with the sliding section such that the sliding section is engageable with the frame for horizontal sliding movement relative to the frame and the frame is further combined with the inclining section such that the inclining section is moveable relative to the frame between a substantially flat position when the sliding section is in the horizontal extended position and an inclined position when the sliding section is in the horizontal retracted position.

14. The convertible bed of claim 13, and further comprising a guide rail combined with and normal to the frame and attachable to a wall of the recreational vehicle to provide a path of vertical travel for the inclining section.

15. The convertible bed of claim 14, wherein the headboard section is engaged with the guide rail for vertical travel thereon.

16. The convertible bed of claim 15, and further comprising a roller combined with the frame and engaging a floor of the recreational vehicle, the recreational vehicle having an expandable room movable between an extended position and a retracted position, the frame attached to the expandable room such that movement of the expandable room causes the frame to roll across the floor.

17. The convertible bed of claim 16, and further comprising an actuator to move the inclining section between the substantially flat position and the inclined position.

18. The convertible bed of claim 17, wherein the actuator has a cylinder and a piston, the cylinder is combined to the sliding section and the piston is combined to the pivoting section, wherein movement of the piston moves the inclining section between the substantially flat position and the inclined position and moves the sliding section relative to the frame.

\* \* \* \* \*